Dec. 3, 1935.   H. S. JANDUS ET AL   2,023,079
BUMPER CONSTRUCTION
Filed March 20, 1933
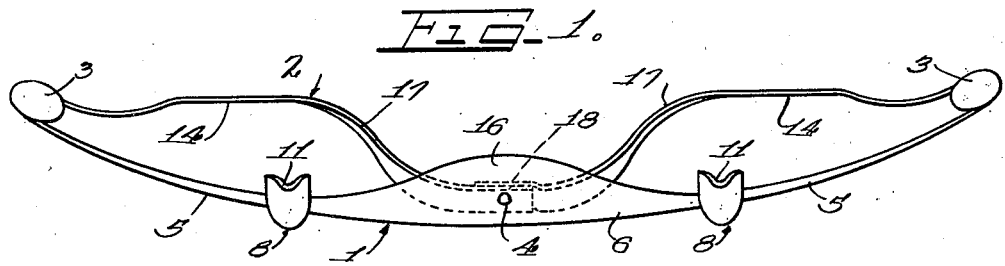
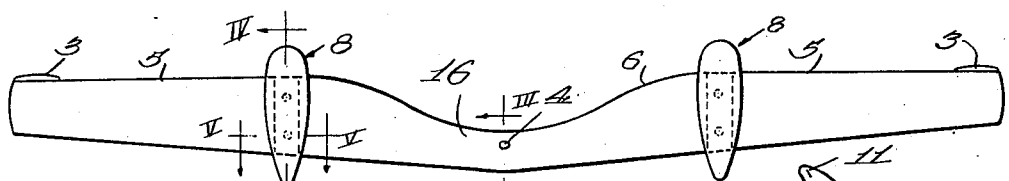
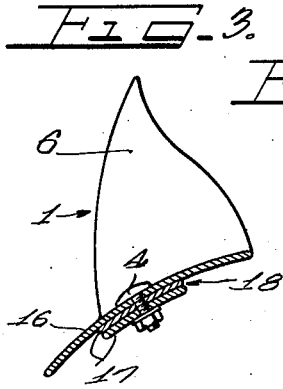
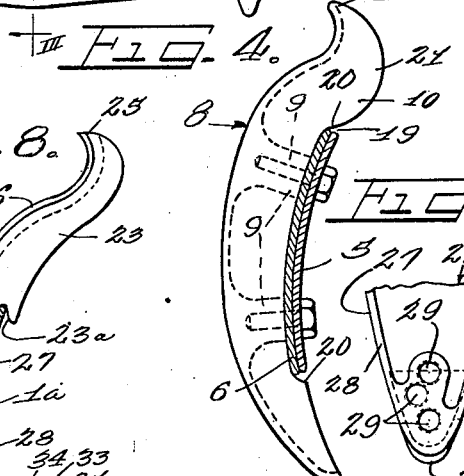
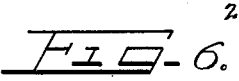
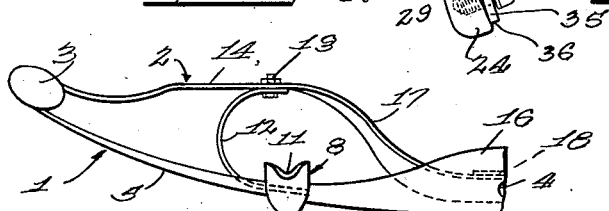
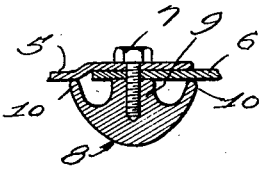
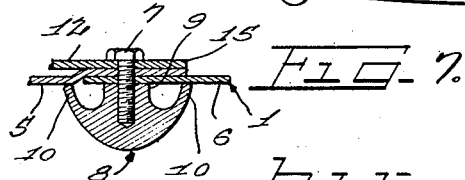
Inventors
HERBERT S. JANDUS,
BLADEN M. SHORT.

Patented Dec. 3, 1935

2,023,079

UNITED STATES PATENT OFFICE 2,023,079

BUMPER CONSTRUCTION

Herbert S. Jandus and Bladen M. Short, Detroit, Mich., assignors to General Spring Bumper Corporation, Detroit, Mich., a corporation of Michigan Application March 20, 1933, Serial No. 661,747

14 Claims. (Cl. 293—55)

This invention has to do with automobile bumpers and is concerned particularly with a bumper of the built up or integral type embodying a guard to prevent overriding of bumpers of colliding vehicles.

Due, among other things, to the lack of standardization of the height of bumpers from the ground, it is a common occurrence for engaging impact bars of colliding cars to ride one over the other, resulting in injury to adjacent vehicle lamps and other parts and in interlocked bumpers which are separated only with great difficulty.

Solutions of the problem thus presented have been attempted heretofore, but have involved constructions which have been expensive to manufacture, difficult to attach in place, fragile and/or included an undesirable number of parts, or for other reasons have been found unsatisfactory.

It is accordingly an object of the present invention to provide a device comprising essentially a single member for attachment to a bumper and formed to substantially increase the effective vertical range through which a bumper of another car can move without interlocking with the first bumper.

It is another object of the invention to provide a bumper with guard means independent of the mounting means of the bumper to prevent interlocking of the bumper with another bumper.

A further object involves the provision of a metallic bumper guard formed to be readily hooked onto an impact bar and to be adjusted therealong and secured in adjusted position.

It is still another object of the invention to provide a bumper guard embodying means whereby the guard may be clamped to bumpers of different sizes.

Another object involves the provision of a bumper guard capable of being securely attached with equal facility to bumpers of different widths and different thicknesses, in any desired location lengthwise of the bumper.

The invention contemplates as another object the provision of a guard of this character formed to limit vertical movement of another bumper relative thereto.

It is a further object to provide a built up bumper bar with clamps which perform the double function of securing the sections together and of guarding against interlocking of the bumper with another bumper by overriding.

Another object resides in the provision of a spring bumper bar having a horizontally reinforced central portion and relatively horizontally yieldable end portions.

In carrying out the invention into practice, one form of guard is formed with a substantially dovetail rear recess in which the bumper bar fits, one side wall of the recess being arranged to be adjusted toward the other side wall and toward the bottom wall to accommodate bumper bars of different widths and thicknesses. This guard may be attached in any adjusted position along the bumper bar, and is formed with a nose to limit relative vertical movement of another bumper.

A built up impact bar made in accordance with this invention may embody, for illustrative purposes, two end sections and one central section having lapped portions which are secured together with clamps as by bolts passing through the lapped portions and into the clamps. The clamps are in other respects preferably the same as those above described. The central section is given a twist rearwardly and downwardly to offer greater resistance to horizontal bending and to conceal the central attached part of the back bar. The bars are connected at their ends in any suitable way as by hinges or pivots. The bumper thus formed, as well as the clamps, is shaped to improve the appearance of the automobile on which it is mounted.

Further objects and advantages of the invention will appear as the description proceeds.

This invention (in preferred forms) is illustrated in the drawing and hereinafter more fully described.

Figure 1 is a plan view of a bumper constructed in accordance with the invention, embodying one form of guard.

Figure 2 is an elevational view of the same.

Figure 3 is a sectional view taken substantially in the plane designated by the line III—III in Figure 2, and showing in elevation a portion of the front face of the impact bar in the background.

Figure 4 is an enlarged view taken in a vertical plane designated by the line IV—IV in Figure 2, parts being shown in section and the others in elevation.

Figure 5 is an enlarged sectional view taken in a horizontal plane designated by the line V—V in Figure 2, one part being shown in elevation.

Figure 6 is a fragmentary plan view similar to the left half of Figure 1 but including a reinforcing member in association with the securing bumper guard.

Figure 7 is a view similar to Figure 5 but including the reinforcing member of Figure 6.

Figure 8 is a view similar to Figure 4 but showing a bumper guard formed as a separable attachment for a bumper.

Figure 9 is a fragmentary rear view of the lower part of the guard shown in Figure 8.

Referring now more particularly to the drawing, a bumper is shown as consisting essentially of a single impact bar 1 and a back bar 2 pivotally connected at their ends 3 and rigidly at their centers 4. The impact bar 1 constructed in accordance with the principles of the present invention is made up of two end sections 5 and a central section 6. The sections 5 and the section 6 have adjacent ends which are overlapped as shown in detail in Figure 5, and are secured together by bolts 7 which pass through the same and are threaded into a clamp member 8. The clamp member 8 is formed with bosses 9 receiving the bolts 7, and is provided with rearwardly extending flanges 10 which, at their intermediate portions, engage against the forward face of the impact member 1 and serve to conceal the connection between the end sections 5 and the central section 6 of the impact bar.

Each clamp 8 is of generally oval form in front elevation and is bowed forwardly as shown in Figures 1, 5 and 6. Each clamp 8, moreover, extends a substantial distance above the upper edge and below the lower edge of the impact bar to thereby effectively extend the vertical range of the impact bar to prevent the impact bar of a bumper of another car from underriding or overriding the impact bar 1. As a further safeguard against interlocking of the impact bar 1 with the impact bar of another vehicle, the clamps 8 are provided with forwardly extending abutments or noses 11 which serve to limit upward riding of another bumper bar relative to said clamps. The clamps 8 are thus in effect buffer plates or guards.

The connection between the overlapping portions of the respective sections 5 and 6 is rigid by virtue of the employment of the clamp construction and bolts as shown, and the connections are sufficiently rigid to render the sectional impact bar 1 substantially as effective as a single integral bar. If desired, however, a preferably spring metal reinforcing element 12 may be interposed between the back bar 2 and the junction of the overlapped portions of the respective sections 5 and 6 as shown in Figures 6 and 7. The reinforcing member 12 may be secured to the back bar 2 in any manner as by the bolt means 13, which may if desired include an extended shank to be threaded in the supporting portion of the frame of the vehicle to be equipped with this bumper construction. If desired, the substantially straight portion 14 of the back bar 2 may be employed to pass through a mounting clamp of the vehicle frame whereby the bumper may be attached in place. The forward portion 15 of each reinforcing member 12 may be secured in position in any desired way, and is preferably formed with bolt holes and positioned between the head of the bolt 7 and the rearmost portion of the connected parts of the impact bar.

The impact bar 1, taken as a whole, simulates, in front elevation, the general form of a propeller in that it is narrow at its center and ends and somewhat wider at its intermediate portions, as where the buffer guard members 8 are located.

The central section 6 is preferably initially a bar of spring steel of substantially uniform width, although its width may be non-uniform if desired. In its formation to constitute a part of the present multi-section bumper construction, the bar 6 is given a transversely arcuate shape as by rolling, and its upper central portion is twisted or bent rearwardly and downwardly to assume the shape shown in cross-section in Figure 3 at 16. The bar is also bent somewhat in its own original plane so that its lower center portion is lowermost and its lower edge defines the shape of a shallow V.

The impact bar 1 has its end sections 5 transversely concavo-convex, this effect being increased from the ends 3 toward the center section 6. The rearwardly extending central portion 16 of the center section 6 affords substantial resistance or reinforcement against horizontal deflection of the section 6 and, by virtue of the rigid connections between the sections 5 and 6, affords substantial resistance or reinforcement to horizontal deflection of the entire impact bar 1.

The back bar 2 may be formed in a single piece but is preferably formed in two pieces 17 which are lapped at 18 at their inner ends and secured at 4 to the downwardly bent portion 16 of the central impact bar section 6. The downwardly bent portion 16 completely overlies the connected portions of the back bar parts 17 and thus effectively conceals or shields an otherwise somewhat unsightly part of the bumper. To facilitate the connection at 4 between the impact bar and the back bar, the lapped portions 18 of the back bar are twisted or bent so that, transversely, they are in substantial parallelism with the backwardly bent portion 16 of the central impact bar section 6 as shown in Figures 1, 3 and 6. The connecting means at 4 is shown to comprise nut and bolt instrumentalities, the head of the bolt appearing in front. If desired, the head of the bolt could be given an ornamental shape or form, as for example that of the clamp or guard plates 8.

It will be observed that the guard flanges 10 are formed with channels 19 which are preferably of substantially the same width as the impact bar where the guards 8 are attached. The side walls 20 of the channels 19 serve to facilitate the positioning of the guard 8 in proper relation to the connected portions of the bars 5 and 6, or, otherwise stated, serve to facilitate the positioning of said bars in proper relation to the guard member 8. The walls 20 further serve to prevent relative vertical movement between the bars 5 and 6 while the same are being prepared to receive the bolts 7. It will be observed that the upwardly extending portion 21 of the guard member 8 also extends somewhat rearwardly to conceal from above the upper overlapped edges of the connected sections 5 and 6, so that when the bumper is observed either from the front or from the top, it has the appearance of a single integral impact bar bumper. The concealment of the overlapped portions 18 of the back bar members 17 is also effective in giving the back bar the appearance of a single integral bar. The back bar 2 is preferably narrower than the impact bar 1 and may be arranged substantially in the same plane so that it is entirely invisible when the bumper is viewed as in Figure 2 in front elevation, or if desired portions such as the portions 14 for securing the bumper to the vehicle frame may be positioned in a plane other than the general horizontal plane of the bumper.

This invention contemplates also the provision of a buffer or guard plate so constructed that it may be attached to any part of an impact bar, regardless whether the same be constructed of a plurality of sections as hereinabove described or of a single integral bar or a plurality of bars extending across the front or back of the vehicle. To this end, there is provided a member 22 shown in Figures 8 and 9 and having a shape conforming generally to the shape of the guard member 8 above described. The guard member 22 has spaced portions 23 extending a substantial distance above the upper edge of the impact bar 1a, and a lower portion 24 extending a substantial distance below the lower edge of the impact bar 1a. The guard member 22 is formed with a nose 25 at its upper end to serve substantially the same purpose as the nose 11 of the guard member 8, namely as an abutment to limit the extent to which the impact bar of the bumper of another car may ride upwardly relative to the guard member 22.

The guard member 22 may be formed of a solid as opposed to a hollow member, but as shown is preferably substantially channel shaped and is preferably convex on its outer surface similar to the guard member 8. To improve the ornamental and streamline effect, a central longitudinal rib 26 may be formed on the outer face of the guard member 22. This rib is further effective in reducing the area of contact between the guard member and the colliding bumper so that when the engagement occurs, defacement of the surfaces of the guard members will be reduced to a minimum.

It will be observed that the guard members 8 and 22 project horizontally beyond the impact face so that they are effective in holding the colliding bumper substantially spaced from the impact face to thereby protect that face from defacement from the colliding bumper.

The sides 27 of the channel shaped guard member 22 are formed with rear surfaces 28 conforming to the impact surface of the bar 1a. The overhanging portions 23 are formed at their lower ends with downwardly inclined shoulders or abutments 23a adapted to be hooked over the upper edge of the impact bar and to engage edges of bars of different thicknesses.

The lower portion 24 of the guard member 22 is preferably not channel shaped but rather block-like and formed with vertically spaced tapped holes 29 to selectively receive a clamp bolt 30. A clamp plate 31 is provided with a hole 32 through which the bolt preferably loosely passes. The hole 32 is preferably eccentrically located and a part of the longer side 33 of the plate 31 is offset at 34 to form a substantially angular or rabbet-like portion for receiving the lower rear marginal portion of the impact bar. The shorter side 35 is preferably of less extent than the distance between the bolt and the beginning of the offset portion 34 so that by backing the bolt and turning the clamp plate until the shorter side 35 is uppermost, when it will clear the bottom of the impact bar, the guard is freely movable onto or along or off the impact bar. To apply the guard, it is necessary merely to hook the portions 23 over the upper edge of the impact bar, swing the guard toward the bar until its rear surfaces 28 engage the impact surface of the bar, turn the clamp plate until its clamping offset portion 34 is back of the bar as shown in Figure 8, and tighten the bolt 30. Thus tilting of the guard in a vertical plane forwardly and rearwardly is prevented.

It will be observed that the guard 22 has a substantially three-point bearing on the impact bar, so that the guard is effectively held against tilting in a plane parallel to the impact bar. Moreover, by virtue of the holes 29, the clamp plate 31 may be supported in different positions of adjustment relative to the abutments 23a, forming with the latter and the surfaces 28 substantially dovetail recesses of different heights to accommodate bumpers of different widths.

The clamping portion 34 extends an appreciable distance in engagement with the lower edge portion of the impact bar so that when clamped against the bar, the clamp member 31 is locked against swinging out of position. The clamp member 31 is arranged moreover so that its clamping portion is pivoted by the bolt 30 about the edge 36 and therefore has a substantial purchase when forced against the bumper bar.

It will be understood that the positions of the fixed clamping part 23 and adjustable clamp plate 31 could be reversed if desired, and that two adjustable instead of one adjustable and one fixed clamping device may be employed.

We are aware that many changes may be made and numerous details of construction may be varied through a wide range without departing from the principles of this invention, and we, therefore, do not purpose limiting the patent granted hereon otherwise than necessitated by the prior art.

We claim as our invention:

1. A bumper comprising an impact bar including sections arranged in tandem with the front face of each substantially a continuation of that of the other, and means affording a rigid connection between the adjacent ends of said sections, the sections being lapped at their juncture, said means including vertically spaced fastening members passing through the lapped portions of the sections, and including also shoulders positioned over and under said portions and adjacent spaced edge portions of the same to assist said members in preventing relative vertical movement of said lapped portions.

2. A bumper comprising end and central spring metal sections rigidly connected together in tandem and constituting in effect an integral impact bar, the end sections and the end portions of said central section being substantially vertical to yield horizontally and the mid-portion of the central section being substantially horizontal to reinforce the middle of the bar against excessive deflection.

3. A bumper comprising end and central spring metal sections rigidly connected together in tandem and constituting in effect an integral impact bar, the end sections and the end portions of said central section being substantially vertical to yield horizontally and the midportion of the central section being substantially horizontally to reinforce the middle of the bar against excessive deflection, and means protecting the connected portions of said sections.

4. A bumper comprising end and central spring metal sections rigidly connected together in tandem and constituting in effect an integral impact bar, the end sections and the end portions of said central section being substantially vertical to yield horizontally and the mid-portion of the central section being substantially horizontal to reinforce the middle of the bar against excessive deflection, a back bar having its ends connected to the ends of the impact bar and whose mid-portion is substantially horizontally under and connected to the middle of the impact bar to assist the same in resisting deflection.

5. A guard to be mounted on a bumper impact bar for assisting in protection of adjacent parts of an automobile, said guard comprising a body having a rear wall for engagement with the impact surface of the bar and an abutment for engaging an edge of the bar, a clamp member for the other edge of the bar, a bolt passing loosely through said member, the body adjacent said member having a plurality of vertically spaced threaded openings for selectively receiving said bolt whereby said member may be adjusted vertically and horizontally so that the body may accommodate bars of different widths and thicknesses.

6. A guard to be mounted by a three point bearing on a bumper impact bar for assisting in protection of adjacent parts of an automobile, said guard comprising a body having a two point bearing on the bar, a clamp member associated with said body and affording the third bearing point for clamping the bar between said member and body, and means for varying the distance from the third point to the first two points to the body to enable the clamp member to be adjusted along the bar and the guard to accommodate bars of different widths and thicknesses.

7. A guard to be mounted by a three point bearing on a bumper impact bar for assisting in protection of adjacent parts of an automobile, said guard comprising a body having a two point bearing on the bar, a clamp member associated with said body and affording the third bearing point for clamping the bar between said member and body, and means for varying the distance from the third point to the first two points and to the body to enable the clamp member to be adjusted along the bar and the guard to accommodate bars of different widths and thicknesses, said clamp member being constructed and arranged so as to be swung about said means free of the bar when it is desired to mount, adjust or remove the guard.

8. Bumper construction comprising an impact bar connection consisting of a pair of impact sections arranged in tandem and lapping, and in endwise abutment with, each other at their adjacent inner ends with the front face of each substantially a continuation of that of the other, a guard of substantially greater height than width and than the bar and means mounting said guard at and passing through said ends so as to rigidly secure said ends together to substantially increase the vertical impact range of the bumper and leave the major portion of each section free to receive impacts.

9. Bumper construction comprising an impact bar having central and end impact sections arranged in tandem, said end sections terminating inwardly at the respective ends of the central section, and separate rigid connections for the junctures between the central section and the end sections to provide substantially a single thickness bar, each connection being formed to shield the section ends connected thereby and including a part extending vertically substantially beyond the bar so as to substantially increase the impact range of the bar, said connections being substantially spaced apart to leave a major portion of the central section free to receive impacts.

10. Bumper construction comprising an impact bar, a cushion bar for mounting the impact bar on a vehicle, said impact bar comprising a pair of impact sections arranged in tandem with each substantially a continuation of the other, and means at the adjacent ends of said sections and said cushion bar affording a rigid connection therebetween, said means being formed to shield said ends and the connected part of the cushion bar and including a part extending vertically substantially beyond the bar so as to substantially increase the impact range of the bar.

11. A guard to be mounted on a bumper impact bar for assisting in protection of adjacent parts of an automobile, said guard comprising a body having a jaw for bearing on an edge of the bar, a second jaw associated with said body for clamping the bar between said jaws, and means adjustably mounting the second jaw on the body and arranged to vary the distance between the jaws and between the second jaw and the body to enable the guard to be adjusted along the bar and accommodate bars of different thicknesses and widths, the second jaw being constructed and arranged so as to be swung about said means free of the bar when it is desired to mount, adjust or remove the guard.

12. A bumper comprising an impact bar including sections arranged in tandem with the front face of each substantially a continuation of that of the other, and instrumentalities including a clamp plate and fastening means therefor affording a rigid connection between the adjacent ends of said sections, said clamp plate having spaced side flanges for clamping engagement with said faces adjacent said ends and provided with spaced upper clamping portions and spaced lower clamping portions for clampingly engaging spaced portions of the upper and lower edges of said sections adjacent said ends, said fastening means passing through said ends and being imbedded in said clamp plate so as to clamp said ends rigidly together.

13. A bumper comprising an impact bar including a pair of impact sections arranged in tandem and having portions lapping, and in endwise abutment with, each other with the front face of each substantially a continuation of that of the other, and instrumentalities including connecting means passing through and affording a rigid connection between said lapped portions, said instrumentalities also including shoulders for engagement with opposite edges of said portions to protect said means from stresses tending to separate said portions.

14. In a vehicle bumper, spaced impact bar sections, a section in endwise abutment with and connected to and bridging the space between and constituting substantially a continuation of the inner extremities of said spaced sections, and shield means arranged at the junctures of and projecting substantially vertically beyond said spaced and bridging sections to protect said junctures and substantially increasing the vertical range of protection afforded by the bumper.

HERBERT S. JANDUS.
BLADEN M. SHORT.